July 17, 1956  A. O. BECKMAN ET AL  2,755,243
ELECTROCHEMICAL ELECTRODE STRUCTURE
Filed May 13, 1952  2 Sheets-Sheet 2
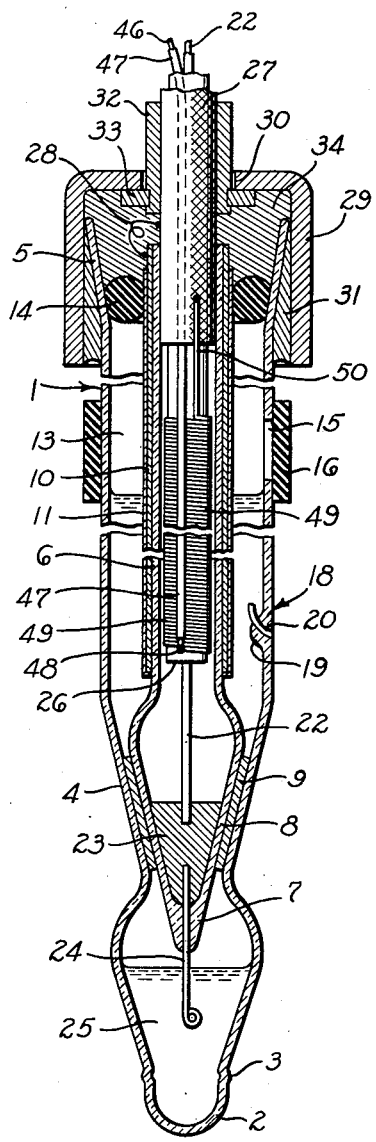
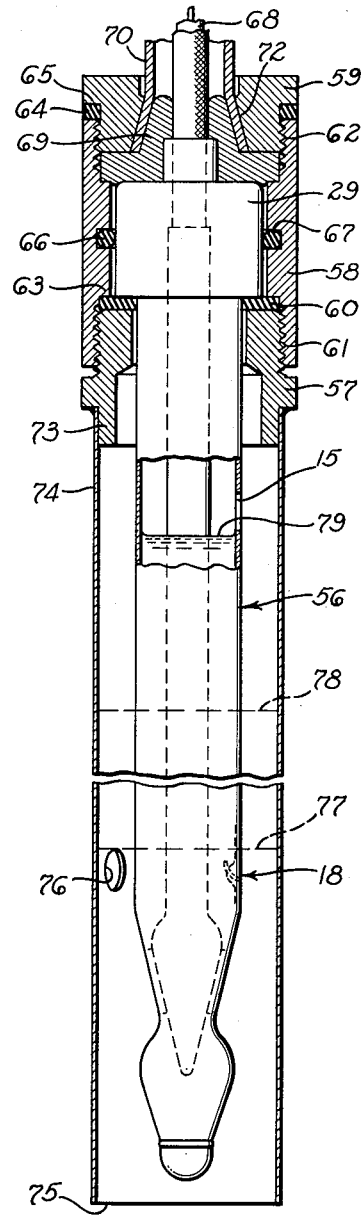
INVENTORS.
ARNOLD O. BECKMAN
EDWIN P. ARTHUR
BY THEIR ATTORNEYS.
HARRIS, KIECH, FOSTER & HARRIS

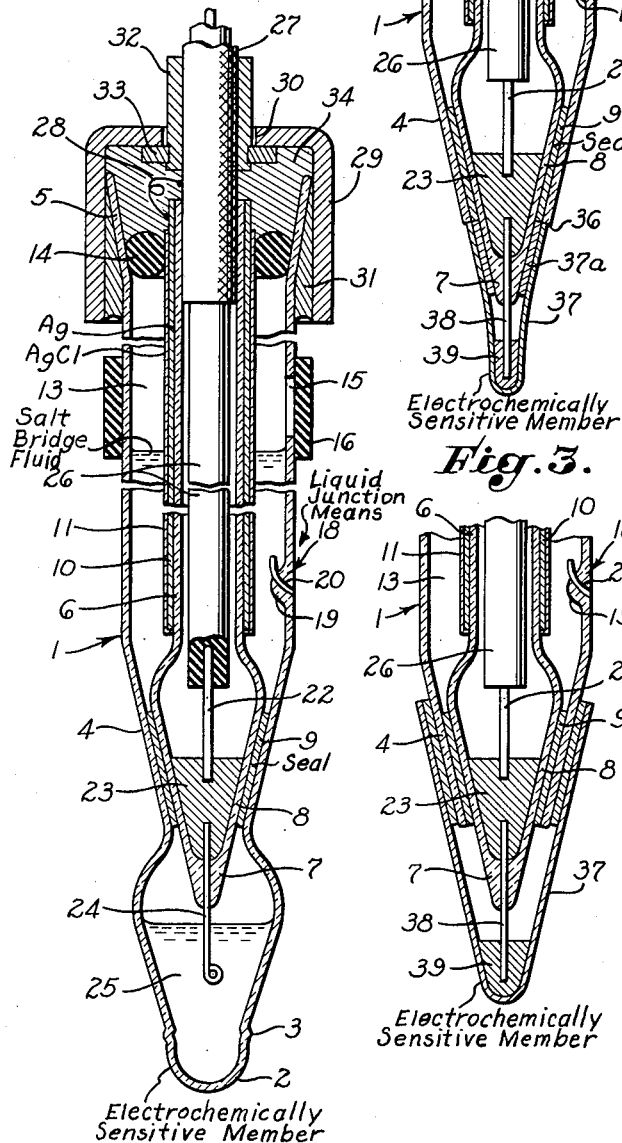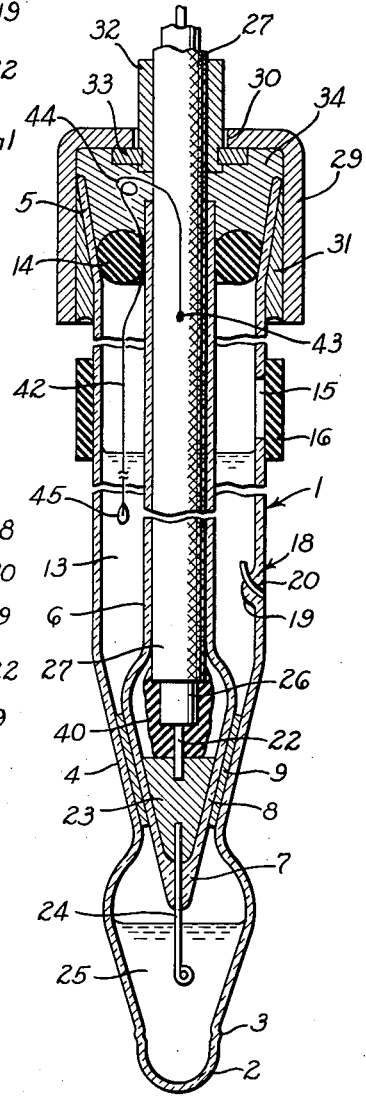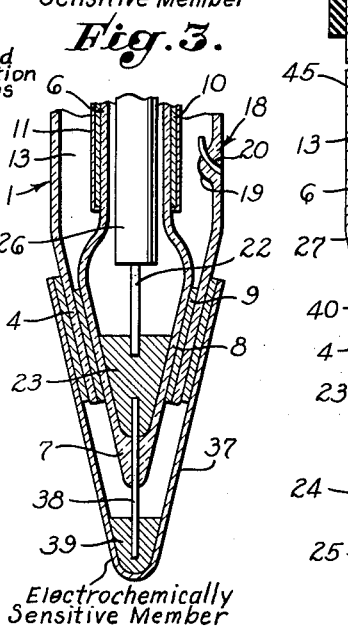

United States Patent Office 2,755,243
Patented July 17, 1956

2,755,243

ELECTROCHEMICAL ELECTRODE STRUCTURE

Arnold O. Beckman and Edwin P. Arthur, Altadena, Calif., assignors to Beckman Instruments, Inc., South Pasadena, Calif., a corporation of California Application May 13, 1952, Serial No. 287,544

24 Claims. (Cl. 204—195)

This invention relates to electrochemical measurements, particularly to an electrode for measuring electrochemical potentials which combines the functions of indicating electrode, reference electrode and salt bridge within a compact and simple structure. Among the forms which the invention may take is a combination glass electrode for the measurement of pH. The electrode of the present invention is further useful in the control of chemical processes and in electrometric titrations of various kinds.

Conventionally, the measurement of electrochemical potential involves the use of two separate electrodes, one an indicator electrode whose voltage with respect to the sample solution varies as a function of a particular sample component; the other a reference electrode which completes the circuit and is designed to maintain a constant potential with respect to the sample solution regardless of variations in the composition of the medium. In some cases, as in the measurement of oxidation-reduction potentials, the indicator electrode may be simply a probe presenting a suitable metal, for example, platinum, palladium or gold, to the sample fluid. In pH measurement, antimony and other types of electrodes have been used, but generally speaking the electrode of choice is the glass electrode.

The reference electrode usually contains a half-cell structure comprising a suitable metal in contact with a substantially fixed concentration of its ions, generally provided by a sparingly soluble salt in contact with the metal. The metal and salt are immersed in an ionic medium, such as aqueous potassium chloride, communicating with the sample fluid via a small aperture or porous connection known as a "liquid junction." Sometimes the ionic medium actually fills a tube bridging the reference half-cell structure and the sample vessel; hence it has been termed "salt bridge fluid." The salt bridge fluid and reference half-cell elements are now more generally combined in a single tube immersed in the sample.

The glass electrode commonly comprises a membrane of pH-sensitive glass sealed to a tubular glass stem and has its own internal half-cell element. This element is immersed in an ionic reference solution contacting the inner surface of the membrane.

For acceptable accuracy, the glass electrode must satisfy certain exacting design requirements. Among these is the maintenance of high insulation resistance throughout the electrode for the inner high-impedance elements. These elements include the half-cell structure within the pH-sensitive glass membrane and the conductor leading from this structure. These must be kept highly insulated from the external electrode surfaces, the electrode cable shield, and any other part of the structure which may be at low impedance. Another requirement is efficient shielding of the high-impedance elements against stray electrostatic fields.

As electrochemical measurements, particularly pH measurements, have become increasingly routine, the need has been felt for further simplification, consolidation of apparatus, and improved convenience of use. While instrumentation in this field has made remarkable strides toward these goals, the inconvenient use of two electrodes has remained characteristic standard practice, albeit the need for a combined electrode has been long and generally recognized. In general use, the improved handling, space-saving and simplification would be very desirable. In special applications, where electrodes must be lowered through narrow ducts or into the narrow necks of laboratory flasks, the need is most compelling.

The absence of a combined electrode from standard electrochemical measurement practice is due largely to the formidable difficulties involved in making a reliable design suitable for commercial manufacture. The successful combined electrode should have over-all dimensions not exceeding those of the present reference or glass electrode alone. Fabrication and assembly should approach in simplicity that for the glass electrode if manufacturing costs are to be kept sufficiently low. The combined electrode should be fully as durable, physically, as the present separate electrodes. All portions of the electrode exposed to the solution, in many cases highly corrosive, should exhibit high resistance to chemical attack.

Attempts to use plastic sleeves, or plastic or other organic types of separators between concentric elements, exposed at least in part to the solution, have not solved the problem. Even the best of plastics are less desirable than all-glass construction for the most inclusive chemical resistance. So also, designs requiring the use of ring-type seals in the glass either at one or both ends of the electrode are objectionable both because such seals increase fabrication cost and represent points of potential failure in the structure upon occurrence of mechanical or thermal stress. The use of such seals at both ends of the structure, multiplying the difficulties of avoiding strains, is virtually intolerable in a commercial electrode, particularly in the short structure contemplated.

While it is possible to design a combined electrode in which the salt bridge fluid surrounds the stem of the glass electrode, this is not per se a satisfactory shielding arrangement because there is no provision against loss of shielding effectiveness in the event that the salt bridge fluid falls to a low level.

Any salt bridge space should not be so narrow as to be difficult to fill; nor should the design result in complex shapes of the outer surface which would be difficult to maintain clean, particularly under conditions tending to form deposits on the electrode.

The commercially practical electrode must meet all of the cited requirements and avoid the mentioned pitfalls without compromising the high insulating and shielding standards necessary for proper glass electrode performance. The difficulty of this task may be judged by the fact that, even in the conventional separate glass electrode, many years and much inventive ingenuity were required to develop a commercial item, suitable for routine use, which incorporated adequate insulation and shielding.

It is an object of the present invention to combine an indicator electrode, reference electrode element and salt bridge structure within a single outer envelope, the maximum outer diameter of the electrode not exceeding that of either the conventional reference or indicator electrode alone. A further object of the invention in one of its embodiments is to provide a combined electrode in which the sensitive element is an electrochemically responsive metal.

Another object of the invention is to provide a combination electrode substantially as easily fabricated in commercial manufacture as the conventional glass electrode.

A further object of the invention is to provide a robust combination glass electrode for the measurement of pH in which the sensitive glass membrane is integrally sealed to the outer glass envelope, the outer envelope being a continuous one-piece enclosure.

Another object of the invention is to provide a combination electrode structure in which effectiveness of shielding is unaffected by variations in height of salt bridge fluid.

Another object is to provide a combination electrode in which high insulation resistance is maintained between the high and low impedance sections of the structure.

A further object of the invention is the elimination of strain in the combination electrode structure through the use of resilient seals joining the ends of the concentric electrode elements, whereby high resistance to mechanical and thermal shock is secured.

Another object of the invention is to provide an outer surface for the electrode which is of smooth form, free of angles and crevices, whereby wiping and cleaning of the structure are facilitated.

A further object of the invention is to provide a generous salt bridge space which may be filled as easily as the conventional reference electrode, albeit retaining small over-all electrode diameter.

Another object is to provide a chemically resistant combination glass electrode and reference electrode which presents an all-glass surface to the sample solution, the exposure of plastic or other organic parts to the sample being eliminated.

Another object of the invention is to provide a compact combination glass electrode and reference electrode which includes also a resistance thermometer element, yet which does not require further enlarging of the electrode diameter.

An additional object of the invention is to provide a reference half-cell element for use in a combination glass electrode, which serves additionally as an electrostatic shield.

A further object of the invention is to provide a combination electrode which may be used at pressures higher or lower than atmospheric, and which may be used simultaneously at elevated temperatures for extended periods of time without deterioration.

Further objects and advantages of the present invention are brought out in the drawings and in the explanation which follows.

Referring to the drawings:

Fig. 1 is a longitudinal cross-sectional view of a combination glass electrode of the invention, greatly enlarged and shown with thicker than actual walls for purpose of clarity;

Fig. 2 similarly represents the lower end of such an electrode but adapted in its lower portion to employ a metallic element as the sensitive area;

Fig. 3 similarly represents a structure related to that of Fig. 2, but showing an alternative mode of construction;

Fig. 4 similarly is a cross-sectional view of a combination glass electrode of the invention showing an alternative type of reference half-cell structure;

Fig. 5 similarly is a longitudinal cross-sectional view of a combination glass electrode additionally combining a resistance thermometer element in its structure; and Fig. 6 similarly represents a high temperature pressure-insensitive combination electrode.

Referring to Fig. 1, the electrode is enclosed in a tubular outer envelope 1, preferably of glass, to which is fused a pH-sensitive membrane 2 at a junction zone 3. The outer envelope 1 is locally constricted near its lower end to form a frusto-conical portion 4 converging in the direction of the sensitive membrane 2. The upper end of the outer envelope 1 is expanded slightly as shown at 5.

Supported within the tubular outer envelope 1 is a liquid-impervious sleeve 6, preferably also of glass. The lower end of this sleeve is terminated in a fused closure 7, and the upper end extends within the expanded portion 5 of the tubular envelope 1.

Relatively near the sensitive membrane 2 is a liquid-tight and insulating seal, provided between a portion of the sleeve 6 and the inner surface of the outer envelope 1. This may take the form of a fused glass ring seal, but preferably it is made as follows. A lower portion of the sleeve 6 is locally expanded into a bulb 8 of conical form substantially matching and fitting within the frusto-conical portion 4 of the tubular outer envelope 1. Filling the intermediate space and separating the aforementioned matching conical portions 4 and 8 is a liquid-tight and electrically insulating seal 9, shown greatly enlarged in thickness in Fig. 1. A thermosetting silicone cement has been found most effective in meeting the severe sealing and insulating requirements, but other types of sealing media can be employed.

Covering the outer surface of the sleeve 6, and extending upward the length thereof from a point near the seal 9, is a layer of metal 10, typically silver, covered in turn, fully or in part, with a layer 11 of a salt of the metal, typically a layer of silver chloride. Preferably, at least a portion of the silver near the upper end of the sleeve 6 is left uncoated with chloride to facilitate electrical connection at this point. The silver and silver chloride layers form a reference half-cell structure of novel usefulness in a combined electrode, as will be shown later, although other more conventional half-cell structures may be enclosed in the annular space 13 between the sleeve 6 and the envelope 1.

The layer of silver 10 is preferably formed on the sleeve 6 by the firing of a silver enamel applied thereto. The silver chloride layer 11 is then formed electrolytically on the silver. Alternatively, the silver layer may comprise a foil or wire wound wrapper on the sleeve 6, coated at least in part with the chloride. Also, the silver chloride layer may optionally be fused on the silver, or a quantity of silver chloride in powder form may be supported by any suitable means at least partially in contact with the silver.

The upper end of the sleeve 6 is resiliently spaced within the tubular outer envelope 1 by means of a rubber O-ring 14 pressed between the expanded upper end 5 of the envelope and the sleeve 6, as shown.

The elongated annular space 13 defined between the sleeve 6 and the envelope 1 above the seal 9 serves as a reservoir for salt bridge fluid. The outer envelope provides a port 15 through which salt bridge fluid may be introduced into the space 13. A rubber sleeve 16 illustrates one convenient form of removable capping means for the port 15.

A liquid junction means 18 extending through the wall of the outer envelope 1 is exemplified as a local thickening or bead 19 integral with the envelope wall through which extends a mandrel or wire of an inert metal 20. The metal may, for example, be palladium, and the bead may be of selected glass of thermal coefficient of expansion suitably lower than that of the metal. The wire is incorporated in the bead at a temperature above the softening point of the bead glass. Upon cooling, a minute annular shrinkage gap is formed around the wire, minute irregularities in the wire surface serving to hold it rigidly in the glass. The annular gap thus formed serves as a passage between the salt bridge fluid body within the space and the external sample fluid body. The liquid junction means thus produced is the subject of the co-pending application of Edwin P. Arthur, Serial No. 207,416, and is not per se a part of the present invention. Alternatively, any type of more conventional liquid junction may be incorporated at the location shown, for example, a junction essentially similar in appearance to that illustrated but employing an asbestos fiber in the place of the metallic wire.

The silver-silver chloride half-cell structure described by way of example above, taken with the salt bridge reservoir space and the liquid junction means, forms the functional counterpart of the conventional separately employed reference electrode, but as an important feature of the present invention this function has been combined integrally with the indicating electrode structure.

Extending through the sleeve 6 is a conducting wire or lead 22 connected electrically at its lower end with the internal surface of the pH-sensitive membrane 2. In the embodiment illustrated in Fig. 1, a body of solder 23 is incorporated in the sleeve 6 above the fused closure 7. Embedded in the solder are the lower end of the conducting lead 22 and one end of a platinum wire 24 extending through the fused closure 7. The outer exposed portion of the wire is silver plated, and coated in turn with a layer of silver chloride, the plating and coating being too thin to be shown in Fig. 1 without undue distortion. The outer portion of the wire may be bent into the form of an eye or otherwise shaped so as to aid in retaining the silver chloride. The silver-silver chloride structure is at least partially immersed in a body of ionic reference solution 25 contacting the inner surface of the pH-sensitive membrane 2. The ionic reference solution is preferably a buffer medium, stable with respect to pH, and contains also a fixed concentration of chloride ion for stabilizing the potential of the silver, and hence the conducting lead 22, with respect to the solution.

The silver-silver chloride layers coating the platinum wire 24, taken with the ionic reference solution 25, form a separate local half-cell for the glass electrode portion of the invention, and is not to be confused with the reference half-cell structure described earlier as incorporated in the annular space 13 between the sleeve 6 and the tubular outer envelope 1. It should be observed that the half-cell adjoining the pH-sensitive membrane serves as a means of electrical communication between the conductor lead 22 and the inner surface of said membrane, whereby a reliably constant potential is maintained between these two elements. The conducting lead 22 is one of two leads serving to connect the invention to a suitable potential measuring apparatus. On the other hand, the reference half-cell structure contained above the seal 9 between the sleeve 6 and the envelope 1 assures constant potential between the second or return lead, completing the circuit between the potential measuring apparatus, and the sample solution, as has been explained.

The local half-cell structure adjoining the membrane 2 may alternatively take the form of other metal-salt combinations, or the half-cell and fluid may be omitted entirely in some cases, the inner surface of the membrane 2 being coated with a metallic layer to which direct connection is made by the platinum wire 24.

As shown in Fig. 1, the conducting lead 22 is preferably part of an insulated and electrostatically shielded cable, the insulation forming a sheath 26 enclosing the conducting lead and being in turn surrounded by a metallic shield 27. The sheath 26 may extend from a point near the lower end of the conducting lead 22, upward and outward of the electrode body. The shield 27 may extend within the sleeve 6 substantially the full length of the insulating sheath 26, starting from a point near the lower end of the sheath, or alternatively, as shown, may be stripped back to a position near the O-ring 14 so as to extend but slightly within the sleeve 6. When the shielding is thus stripped back, the exposed surface of the sheath 26 extending substantially the length of the sleeve 6 may be used as a base upon which to wind, as an additional electrode element, a resistance thermometer in the form of a coil of resistance wire, as will be later explained.

As a feature of the invention, we observe that when the metallic shield 27 is not made to extend within the sleeve 6 substantially the full length of the conducting lead 22, the silver layer 10 of the reference half-cell structure, extending substantially that full length in lieu of the shield 27 albeit on the outer surface of the sleeve 6, may serve itself as an effective shield in place thereof. As shown in Fig. 1, the layer of silver 10 may, if the associated measuring circuit allows, be connected directly to the metallic shield 27 by means of a connecting wire 28.

The outer envelope 1 is preferably provided at its upper end with a rigid cap 29 as shown in Fig. 1. The cap provides a passage 30 for outward extension of the conductors, the latter being generally combined, as shown, in the form of an insulated and shielded cable. The cap 29 is secured to the outer envelope by a rigid cement seal 31 filling the space between these two members as indicated. The cable as originally constituted is generally provided with a protective covering 32. In practice, when incorporating the cable into the electrode, this covering is stripped back, only a small portion thereof entering within the electrode cap 29. The cable is firmly anchored in the electrode body by binding means here represented by a binding washer 33, securely locked on the portion of the protective covering 32 lying within the cap 29. A non-rigid cement 34 fills the interior of the cap 29 above the O-ring 14 and seals all of the elements in the cap.

The resistance uniquely provided by the above described structure to mechanical and thermal stresses is apparent. The seal 9 of the electrode is generally relatively rigid, though much more resilient and resistant to fracture than a glass ring seal. At the upper end of the sleeve 6, however, a seal of particularly high resilience has been provided comprising the rubber O-ring 14 and the body of non-rigid cement 34. Accordingly, it is virtually impossible, first, to build strains into the structure joining the sleeve 6 and the envelope 1. Moderate misalignments of the sleeve within the envelope are readily accommodated by the resilient upper support. Second, if the electrode is subjected in use to large variations of temperature, no concern need be felt about differential expansion between the sleeve 6 and the envelope 1, due perhaps to a difference in coefficients of expansion between the respective materials. The gain in resistance to physical stress may be appreciated on similar considerations.

It will be noted that the tubular outer envelope 1 and the sensitive membrane 2 fused thereto form a smooth, continuous and integral surface, free of crevices and easy to clean. The surface contacting the solution to be tested can be entirely glass, excepting only, when certain types of liquid junction are used, the presence of an inert metal wire or asbestos fiber at the junction.

Without special attempt at miniaturization, the dimensions of the combined electrode may be the same as those of the conventional glass or reference electrode, and the electrode may be supported in the standard fixtures currently in use. For example, outside cap diameter may be 16 millimeters and outside envelope diameter may be 11.5 millimeters, the length to width ratio being conventional.

The salt bridge reservoir space 13 is generous in width and volume, an ease of filling having been retained comparable to that of the conventional reference electrode. Also, ample volume of fluid accommodated makes frequent refilling unnecessary. It may be seen also that no reliance is placed on the salt bridge fluid for shielding purposes, this being provided either by the cable shield 27 extended within the sleeve 6, or by the metallic layer 10 of the reference half-cell structure. Shielding effectiveness is therefore independent of height of the salt bridge fluid column.

Referring to Fig. 2, the lower portion of an electrode is shown similar to that of Fig. 1 except that the lower terminal portion sealing off the tubular outer envelope 1 includes a sensitive area of metal instead of a pH-sensitive glass membrane and associated half-cell structure. In the structure shown, the conical bulb section 8 of the sleeve 6, joined by the liquid-tight and insulating seal 9 to the frustoconical portion 4 of the outer envelope 1, extends outward of a terminal edge 36 of the outer envelope. Joined to the outward-extending portion of the bulb section 8, preferably in the form of a cone covering its entire surface up to the terminal edge 36 of the envelope, is a sensitive metallic shell member 37. This is fitted over the projecting bulb section 8 by spinning, adhesion being further assured by a silicone cement bond 37a intermediate the closely adjoining surfaces. If desired, the shell member 37 may terminate short of the terminal edge 36. Electrical connection is made between the metallic shell member 37 and the conducting lead 22 by way of a wire 38, for example of platinum, one end of which is embedded in a solder body 39 within the shell member 37, the wire extending through the fused closure 7 and being embedded at its upper end in the solder body 23 contained in the bulb 8. Joined also to the solder body 23 is the conducting lead 22, as before, the remainder of the electrode being similar to that in Fig. 1.

The electrode of Fig. 2 shares with the glass electrode of Fig. 1 the advantages of compactness, convenience, ruggedness, reliability and ease of manufacture. It finds use wherever the combination of metallic and reference electrodes is required, for example in the measurement of oxidation-reduction potentials, and in the performance of various types of titrations. For the measurement of oxidation-reduction potentials an inert metal is usually employed, generally platinum but sometimes palladium, gold or other inert metal. Sometimes a given metal is employed for its sensitivity to concentration of ions of that metal in a solution. For example, the silver electrode has frequently been employed in the titration of silver ion, or of anions such as the halides, cyanide, etc., forming with silver an insoluble salt or complex ion. As an example of another metallic electrode, antimony has sometimes been employed in the measurement of pH, although the glass electrode is generally preferred.

Referring to Fig. 3, a modified construction is shown of similar intent to that of Fig. 2. Here the sensitive metallic shell member 37 is fitted to extend over the frustoconical portion 4 of the outer envelope 1 as shown. The conical space intermediate the shell member 37 and the envelope 1 is sealed with a thermosetting silicone resin. The construction is in other respects similar to that of Fig. 2. The arrangement of Fig. 3 may be preferred when a relatively large sensitive area is desired. A somewhat sturdier structure is also provided thereby.

Referring to Fig. 4, a view is shown, partly in cross-section, of a combination glass electrode similar to that of Fig. 1 but illustrating an alternative reference half-cell structure and internal shielding method of the invention. In this embodiment, the metallic cable shield 27, enclosing the insulating sheath 26 and the conducting lead 22, is extended within the electrode body substantially the full length of the sleeve 6 to insure adequate internal shielding without reliance on the salt bridge fluid column. A length of the insulating sheath 26 is left bare, as shown, to insure adequate insulation between the cable shield 27 and the conducting lead 22 where the latter enters the solder body 23. For added protection, the exposed portion of the sheath 26 and the adjoining portions of the shield 27 and the conducting lead 22 are coated as shown by a layer of insulating resin 40.

The reference half-cell structure in the embodiment of Fig. 4 comprises a silver wire 42 soldered or otherwise connected at a convenient point 43 to the cable shield 27 as shown, if the measuring circuit employed with the electrode so permits, or alternatively, joined to an additional separate conductor leading outward of the electrode. A slack portion 44 of the silver wire permits more convenient assembly, the wire being continued from the point 43 past the O-ring 14 and extended downward into the annular reservoir space 13. At least a portion of the silver wire 42 therein extended contacts a body or layer of silver chloride, this taking the form in the embodiment shown of a bead 45 of silver chloride fused to the wire and contacting the salt bridge liquid.

Fig. 5 shows a combination glass electrode of the present invention similar to that of Fig. 1 but incorporating additionally a resistance thermometer element. As is well known, the voltage developed by a potentiometric indicator electrode at any given concentration of the sample ion is a function of temperature. More specifically, it is known that the developed voltage varies substantially linearly with the logarithm of ion concentration, and that the slope of this line is proportional to absolute temperature. When potentiometric measurements of ion concentration are made at various temperatures, as in the measurement of pH, it is therefore necessary to correct or adjust response of the measuring means for temperature effect. Some instruments require that the operator measure sample temperature and then make a manual circuit adjustment. However, it is often desirable, particularly in automatic recording of pH, to make the circuit adjustment continuously and automatically in response to changes in temperature at the sample site. Circuits are currently in use which include a resistance thermometer element immersed in the sample, making the necessary adjustment automatically, but the thermometer element is typically a separate, third element inserted into the sample in the form of a probe together with the reference and glass electrodes. The electrode of Fig. 5 conveniently combines these three elements within a simple and compact structure. Although Fig. 5 exemplifies the lower electrode portion as of the pH-sensitive glass membrane type, the combination featured is applicable likewise to other types of ion-sensitive electrodes.

In Fig. 5, the cable shield 27 extends but slightly within the sleeve 6. On the other hand, the bare insulating sheath 26 extends into the sleeve 6 substantially the full sleeve length. The addition of the resistance thermometer element may require either one or two additional conductors extending outward of the electrode body, depending on measuring circuit design. In the embodiment shown in Fig. 5, the use of a single additional conductor 46 is shown, incorporated in the outwardly extended shielded cable. The conductor 46 is independently insulated by an insulating coat 47, the conductor and its coat both extending into the sleeve 6 substantially to the end of the insulating sheath 26. At this point, a connection 48 is made with one end of a temperature-sensitive resistance wire 49 of selected characteristics and dimensions, the wire 49 being continued upward as a winding on the insulating sheath 26 and terminating in a connection 50 to the cable shield 27. In the embodiment shown, the cable shield 27 accordingly serves as a common return lead both for the electrode circuit and the resistance thermometer element. Internal shielding for the electrode is provided, in the present embodiment, by the layer of metal 10 on the surface of the sleeve 6, forming part of the reference half-cell structure in the manner of Fig. 1.

Referring to Fig. 6, a combination electrode of the present invention is shown as adapted for operation in sample media at pressures higher or lower than atmospheric and suitable, furthermore, for prolonged use at high temperatures without deterioration. The embodiment shown employs a novel pressure-sheathing arrangement claimed generally in the co-pending application of Edwin P. Arthur, Serial No. 207,415. The present adaptation provides a combination electrode which may be lowered to extended depths through narrow conduits into tanks or vessels under test, often at elevated pressure and containing highly corrosive media. For example, the electrode shown has successfully withstood prolonged exposure in 60% nitric acid at 80° C., the pressures approaching 30 lbs. p. s. i. The use of a silver-silver chloride reference half-cell structure of the form shown in either Fig. 1 or Fig. 4 has been found markedly superior, for continuous use at high temperatures, to the calomel type of half-cell generally used. Typically, usefulness of the calomel type electrode is lost after a few hours of exposure to temperatures near the boiling point of water, due to deterioration of the mercury-calomel layer structure, involving separation of the components and loss of calomel to the salt bridge fluid. Deterioration is particularly marked when large and frequent temperature excursions occur. The simple, solid structure of the silver-silver chloride half-cell shown, avoiding use of powdered components and a liquid metallic element, accordingly has been found much more serviceable.

Numeral 56 indicates in outline, by way of example, a combination glass electrode of the invention, for example any of the electrodes of Figs. 1, 4 or 5, usually omitting the rubber sleeve 16 which normally closes the opening 15 in the previously described embodiments. Alternatively, however, the electrode may be one of the metallic types shown in Figs. 2 and 3. The electrode is secured in a supporting and sealing assembly comprising a lower nut member 57, a gland member 58 and an upper nut member 59. The lower shoulder of the electrode cap 29 rests against a polyethylene gasket 60 seated on the upper edge of the lower nut member 57 as shown. The gland member 58 is joined to the lower and upper nut members 57 and 59 by threads 61 and 62 respectively.

A seal is effected between the gland member 58 and the two nut members respectively by the gasket 60 adjoining a shoulder 63 of the gland member and by a second polyethylene gasket 64 compressed against the upper edge of the gland member by a shoulder 65 of the upper nut member. A seal between the wall of the electrode cap 29 and the gland member 58 is effected by an O-ring 66 retained in a recess 67 of the gland member as shown.

An electrode cable 68 emerging from the electrode cap 29 is enclosed at the point of emergence by a body of rigidly setting cement 69. The cement is cast and set in situ, serving as a seal and retaining means for the flared lower end portion of a polyethylene tube 70 extending upward as a protective shield around the electrode cable 68. The polyethylene tube 70 is further secured by the tapered conical inner surface 72 of the upper nut member 59, pressing the tube 70 against the cement body 69.

Welded in liquid-tight relation to a shoulder 73 of the lower nut member 57 is a thin-walled stainless steel tube 74 extending downward as a pressure sheath or skirt to a position slightly below the lower tip of the combination electrode. The tube 74 is open at its lower end 75 and provides a hole 76 at or slightly above the level of the liquid junction 18.

In use, as the electrode assembly of Fig. 6 is lowered into the sample medium, a body of air, gas or vapor existing above the sample medium is trapped within the tube 74 above the level of the hole 76, i. e., from dotted line 77 upward. If the pressure is further increased, as by further submergence or otherwise, the gas body within the pressure sheath may be further compressed, for example to dotted line 78. If the pressure of the medium is at any time made lower than the pressure at which the gas was originally trapped (assuming that the temperature remains unchanged), an excess of gas may, within limits, be safely vented from the hole 76 without affecting proper use of the electrode. In any case, the use of the tube 74, in addition to providing physical protection, allows substantial equalization of pressure on both sides of the liquid junction 18, the internal pressure at the junction being larger than the external pressure only by the hydrostatic pressure of the salt bridge column, measured from the meniscus 79. The slight excess of internal pressure reliably maintained by these means assures the continuous controlled outflow of salt bridge fluid via the junction 18 necessary for proper electrode operation.

While the invention has been described in its preferred embodiments and with relation to particular half-cell means, it will be apparent to those skilled in the art that other half-cell means may be used, desirably of the type in which a metal and a salt of a metal are in contact, and that various changes and modifications can be made in the combined electrodes of the exemplified embodiments without departing from the spirit of the invention.

We claim as our invention:

1. An electrode structure for electrochemical measurements which combines indicator and reference electrode functions, comprising: inner and outer tubular members spaced to define an annular space therebetween for a salt bridge liquid, one of said tubular members providing an electrochemically sensitive member at its lower end; an annular seal sealing said tubular members at a position above said sensitive member and forming the lower boundary of said annular space; a conducting lead extending downwardly within said inner tubular member; a reference half-cell in said annular space comprising a cylindrical element formed of metal surrounding said inner tubular member in at least the lower portion of said annular space, said cylindrical metal element acting as a shield for said conducting lead in addition to the shielding action of any salt bridge liquid in said annular space, said reference half-cell including a coating on at least a part of said cylindrical element, said coating being formed of a salt of said metal; liquid junction means extending through said outer tubular member at a position above said annular seal; and means for electrically connecting said conducting lead to said electrochemically sensitive member.

2. An electrode structure for electrochemical measurements which combines indicator and reference electrode functions, comprising: concentric inner and outer glass tubular members spaced to define an annular space therebetween for a salt bridge liquid, said outer tubular member providing a port means for introducing said salt bridge liquid into said annular space, one of said tubular members providing an electrochemically sensitive member capping its lower end, said one of said glass members providing a portion above said electrochemically sensitive member and opposite a portion of the other of said glass members; an annular sealing means joining said portions of said glass members at a position above said electrochemically sensitive member, said annular sealing means forming the lower boundary of said annular space, said inner glass tubular member providing an upper section above said sealing means extending throughout the length of said outer glass tubular member to form said annular space therebetween; a conducting lead extending downwardly within said upper section of said inner glass tubular member; means for electrically connecting the lower end of said conducting lead to said electrochemically sensitive member; a metallic shield within said upper section of said inner glass tubular member and surrounding a large portion of the conducting lead lying within such upper section, said metallic shield acting as a shield for such portion of said lead in addition to the shielding action of any salt bridge liquid in said annular space; a liquid junction means extending through said outer tubular member at a position above said annular sealing means; and a reference half-cell means in said annular space.

3. An electrode structure for electrochemical measurements which combines indicator and reference electrode functions, comprising: a tubular outer member formed of glass; a tubular inner member formed of glass, said inner member being disposed in said outer member and cooperating therewith in providing a salt bridge fluid reservoir; a seal between the glass of said outer and inner members at the bottom of said reservoir; a fused closure at the bottom of said inner tubular member close to said seal; a conductor extending through said fused closure; an electrochemically sensitive member attached to one of said members at a position below said seal; means for electrically connecting said sensitive member and said conductor; a conducting lead extending downwardly in said inner tubular member and connected to said conductor; port means for introducing a salt bridge fluid into the upper end of said reservoir; liquid junction means extending through said tubular outer member at a position above said seal and communicating between said reservoir and the exterior of said outer member; and a reference half-cell means above said seal within said reservoir.

4. An electrode structure for electrochemical measurements which combines indicator and reference electrode functions, comprising: a tubular outer member formed of glass; a tubular inner member formed of glass and disposed within said outer member, said members cooperating in providing a salt bridge fluid reservoir; a relatively rigid seal between the glass of said outer and inner tubular members forming the bottom of said reservoir; an electrochemically sensitive member attached to one of said members at a position below said seal; a conducting lead extending downwardly in said inner tubular member; means for electrically connecting said conducting lead to said electrochemically sensitive member; a resilient spacing means for spacing the upper ends of said inner and outer tubular members and forming a resilient seal therebetween bounding the upper end of said reservoir; port means for admitting a salt bridge fluid to said reservoir; liquid junction means through said tubular outer member above said relatively rigid seal for discharging a minute stream of said salt bridge fluid from said reservoir to the exterior of said tubular outer member; a reference half-cell means in said reservoir; and an electrical conductor connected to said reference half-cell means, said conductor and said conducting lead extending upwardly to a position above said resilient spacing means.

5. An electrode structure for electrochemical measurements which combines indicator and reference electrode functions, comprising: a tubular outer envelope including a lower portion sealing off said outer envelope, said lower portion including an electrochemically sensitive portion; a conducting lead extending within said outer envelope and electrically communicating at its lower end with said sensitive portion; an insulating sleeve enclosing said conducting lead and extending within said outer envelope from a point near said sensitive portion, said sleeve and said tubular outer envelope cooperating in defining an annular space for a salt bridge fluid; walls defining an opening communicating with said annular space for introducing salt bridge fluid thereinto; an annular liquid-tight and electrically insulating seal between said sleeve and said outer envelope; liquid-junction means extending outwardly through said outer envelope at a position above said seal; and reference half-cell means above said seal and within said annular space.

6. An electrode structure as defined in claim 5 including a resistance thermometer means within said sleeve and spaced from said conducting lead.

7. An electrode structure as defined in claim 5 including a sheath of insulating material around said conducting lead within said sleeve, and a resistance thermometer means comprising a length of resistance wire wound around said sheath of insulating material within said sleeve.

8. An electrode structure as defined in claim 5 in which said electrochemically sensitive portion is a metallic member.

9. An electrode structure as defined in claim 5 in which said reference half-cell means comprises a layer of metallic silver covering at least a portion of said sleeve above said seal, at least a portion of said layer being coated with a layer of silver chloride, and conducting means connected with said layer of silver and leading outward of the electrode structure.

10. An electrode structure as defined in claim 9 in which said sleeve is formed of glass, said layer of silver being fused to the outer surface of said glass.

11. An electrode structure as defined in claim 5 in which said half-cell means comprises a silver wire extending into said annular space, at least a portion of said wire being coated with silver chloride.

12. A combination electrode for measuring pH and which combines reference electrode, glass electrode and salt bridge structures within a single glass enclosure, said combination electrode comprising: a tubular outer glass envelope forming said glass enclosure and including a supporting tubular stem and a pH-sensitive glass membrane integrally fused thereto, said glass membrane sealing off the lower portion of said outer glass envelope and providing an inner surface; a conducting lead extending longitudinally through said envelope and providing a lower end communicating electrically with said inner surface of said glass membrane; a sleeve formed of insulating material enclosing said lead and extending through said envelope from a point near said membrane, the outer surface of said sleeve and the inner surface of said envelope cooperating in defining an elongated salt bridge fluid space; a liquid-tight and electrically insulating annular seal between a portion of said sleeve near said membrane and the inner surface of said envelope; liquid junction means extending through said envelope at a position above said seal; a reference half-cell structure in said elongated space; and port means for introducing salt bridge fluid into said elongated space.

13. An electrode as defined in claim 12 including a shielded cable comprising said conducting lead, a sheath of insulating material around said lead and a metallic shield around said sheath, said metallic shield extending upwardly through said sleeve from a point near said membrane.

14. A combination electrode for measuring pH and which combines reference electrode, glass electrode and salt bridge structures within a single glass enclosure, said combination electrode comprising: a tubular outer glass envelope forming said glass enclosure and including a supporting tubular stem and a pH-sensitive glass membrane integrally fused thereto, said glass membrane sealing off the lower portion of said outer glass envelope and providing an inner surface; a conducting lead extending longitudinally and downwardly through said envelope and providing a lower end; a glass sleeve enclosing said lead and extending upwardly through said envelope from a point near said membrane, the outer surface of said sleeve and the inner surface of said envelope cooperating in defining an elongated salt bridge fluid space; a fused closure terminating the lower end of said sleeve; conductive means providing an upper portion connected to said lower end of said conducting lead, said conductive means extending downwardly through said fused closure to provide a lower portion external of said fused closure, said lower external portion comprising the metal element of a first half-cell structure and being immersed in an ionic reference solution contacting said inner surface of said pH-sensitive glass membrane; a liquid-tight and electrically insulating annular seal above said membrane and sealing said outer surface of said sleeve to said inner surface of said envelope; port means for introducing a salt bridge fluid into said elongated space; a liquid junction means for discharging a minute stream of said salt bridge fluid from said elongated space to the exterior of said envelope; and a second half-cell structure supported within said elongated space and comprising a reference half-cell structure.

15. A combination electrode as defined in claim 14 in which said second half-cell structure comprises a layer of silver on one of said surfaces bounding said elongated space and extending substantially the entire length of said sleeve from a point near said annular seal, said layer of silver serving as an electrical shield for said conducting lead, and a layer of silver chloride contacting at least a portion of said layer of silver.

16. A combination electrode as defined in claim 14 in which said second half-cell structure comprises a silver wire extending within said elongated space, and a coating of silver chloride covering at least a portion of said wire.

17. A combination electrode as defined in claim 14 in which said supporting tubular stem of said glass envelope provides a constricted portion near said sensitive membrane, said constricted portion providing an inner tapered surface converging downwardly in substantially frusto-conical form, and in which said glass sleeve includes a bulbous portion above its fused closure, said bulbous portion including a tapered external surface substantially matching and fitting within said substantially frusto-conical inner surface, said annular seal comprising a layer of insulating material between said tapered surfaces.

18. A combination electrode as defined in claim 14 including resilient means for spacing the upper end of said sleeve within said outer glass envelope, said resilient means sealing the upper end of said elongated space.

19. A combination electrode as defined in claim 18 including a rigid external cap means, the upper end of said outer glass envelope being embedded within said cap means, said cap means including passage means, said conducting lead extending through said passage means, and including conducting means electrically connected to said second half-cell structure and extending through said passage means.

20. A combination electrode as defined in claim 19 including a shielded cable extending through said passage means and comprising a conductor, an insulating sheath around said conductor and a metallic shield, said conductor being said conducting lead, said shield being said conducting means connected to said second half-cell structure.

21. A pressure-insensitive combination electrode structure combining indicator and reference electrode functions and immersible in a fluid medium to be tested, said structure comprising: a tubular outer envelope including a lower terminal portion sealing off said outer envelope, said lower portion including an electrochemically sensitive portion; a lead extending through said envelope and electrically communicating at its lower end with said electrochemically sensitive portion; a sleeve of insulating material enclosing said lead and extending upwardly in said envelope from a point near said electrochemically sensitive portion, said sleeve providing an external surface and said envelope providing an inner surface, said surfaces being spaced to define a reservoir space; an annular liquid-tight and electrically insulating seal near said sensitive portion and extending between said inner and external surfaces; liquid junction means extending through said envelope above said seal, said reservoir being adapted to contain a salt bridge fluid, said salt bridge fluid discharging slowly through said liquid junction means to the exterior of said envelope; a reference half-cell structure supported in said reservoir space; a sheath of larger size than said envelope; and means for mounting said sheath around said envelope to provide an annular gas space therebetween, said mounting means closing the upper end of said annular gas space, said outer envelope providing an opening communicating between said reservoir space and said gas space, the lower end of said gas space being open to the fluid medium to be tested to entrap a body of gas in said gas space upon immersion of said sheath in said fluid medium, said opening in said outer envelope transmitting to said salt bridge fluid the pressure of said fluid medium at the depth of immersion.

22. A pressure-insensitive combination electrode as defined in claim 21 in which said sheath is open at its lower end to said fluid medium and includes an opening communicating between said gas space and said medium, the uppermost portion of said opening being slightly above said liquid junction means.

23. An electrode structure for electrochemical measurements of liquids undergoing test and which electrode structure combines indicator and reference electrode functions, comprising: a tubular outer member formed of glass; a tubular inner member formed of glass and disposed within and spaced from said outer member throughout a large portion of the lengths of such members to provide therebetween an annular salt bridge fluid reservoir; a relatively rigid sealing member bridging and integrating in fluid-tight relationship said tubular members at a lower position, such sealing member forming the lower boundary of said fluid reservoir; an electrochemically sensitive member fused to one of said tubular members at a position below said sealing member and providing an outer surface exposed for contact with said liquid undergoing test; a conducting lead extending downwardly in said tubular inner member; means for electrically connecting said conducting lead to said electrochemically sensitive member; means for sealing the upper ends of said tubular inner and outer members, such sealing means forming the upper boundary of said fluid reservoir; port means communicating with said fluid reservoir at a position below such sealing means for admitting a salt bridge fluid to said reservoir; liquid junction means through said tubular outer member at a position above said relatively rigid sealing member for discharging a minute stream of said salt bridge fluid from said reservoir to such liquid undergoing test; a reference half-cell means in said fluid reservoir; and an electrical conductor connected to said reference half-cell means, said conductor and said conducting lead extending upwardly to a position above said sealing means at the upper end of said fluid reservoir.

24. An electrode structure as defined in claim 23 in which said relatively rigid sealing member bridging and integrating said tubular members is a fused glass ring seal.

References Cited in the file of this patent

UNITED STATES PATENTS

| 2,289,610 | Wallace | July 14, 1942 |
| 2,311,976 | Coleman | Feb. 23, 1943 |
| 2,311,977 | Coleman | Feb. 23, 1943 |
| 2,340,642 | Cameron | Feb. 1, 1944 |
| 2,345,498 | Perley | Mar. 28, 1944 |

OTHER REFERENCES

"Science," Oct. 25, 1940, pages 385 and 386.